US010446188B2

(12) United States Patent
D'Autremont

(10) Patent No.: US 10,446,188 B2
(45) Date of Patent: Oct. 15, 2019

(54) METHOD AND APPARATUS FOR LOW LATENCY NON-LINEAR MEDIA EDITING USING FILE-BASED INSERTS INTO FINALIZED DIGITAL MULTIMEDIA FILES

(71) Applicant: Cine Design Group LLC, New York, NY (US)

(72) Inventor: Charles A. D'Autremont, New York, NY (US)

(73) Assignee: CINE DESIGN GROUP LLC, New York, NY (US)

( * ) Notice: Subject to any disclaimer, the term of this patent is extended or adjusted under 35 U.S.C. 154(b) by 0 days.

(21) Appl. No.: 15/374,545

(22) Filed: Dec. 9, 2016

(65) Prior Publication Data

US 2017/0169855 A1  Jun. 15, 2017

Related U.S. Application Data

(60) Provisional application No. 62/265,795, filed on Dec. 10, 2015.

(51) Int. Cl.
| | | |
|---|---|---|
| G11B 27/036 | (2006.01) | |
| H04L 29/06 | (2006.01) | |
| H04N 21/854 | (2011.01) | |
| H04N 21/236 | (2011.01) | |

(52) U.S. Cl.
CPC .......... *G11B 27/036* (2013.01); *H04L 65/601* (2013.01); *H04N 21/23605* (2013.01); *H04N 21/23611* (2013.01); *H04N 21/85406* (2013.01)

(58) Field of Classification Search
USPC ................................. 386/278–290, 326–334
See application file for complete search history.

(56) References Cited

U.S. PATENT DOCUMENTS

| | | | | |
|---|---|---|---|---|
| 5,128,945 A | * | 7/1992 | Enns ...................... | H04L 7/048 370/474 |
| 6,026,232 A | | 2/2000 | Yogeshwar et al. | |
| 6,112,009 A | * | 8/2000 | Kikuchi ............... | G06F 3/0601 386/241 |
| 6,654,933 B1 | * | 11/2003 | Abbott ............... | H04N 7/17318 348/E7.071 |
| 8,863,182 B1 | * | 10/2014 | Sharifi ................ | H04N 21/233 725/38 |
| 2004/0177383 A1 | | 9/2004 | Martinolich et al. | |
| 2007/0247549 A1 | * | 10/2007 | Jeong ..................... | H04N 19/70 348/471 |

(Continued)

OTHER PUBLICATIONS

"Cinedeck File-Based Insert Editing Smashes Editorial Roadblock" dated Mar. 24, 2015, downloaded from http://www.digitalfacility.com/article/Cinedeck-File-Based-Insert-Editing-Smashes-Editorial-Roadblock on May 13, 2015, 2 pages.

(Continued)

*Primary Examiner* — Hung Q Dang
(74) *Attorney, Agent, or Firm* — Thompson Coburn LLP

(57) ABSTRACT

Techniques are disclosed for non-linear media editing where insert edits are performed directly on finalized digital multimedia files to replace target frames of essence data with new frames of essence data without modifying metadata within the finalized digital multimedia files. Through these techniques, the time-consuming process of re-exporting an edited multimedia file is avoided.

35 Claims, 14 Drawing Sheets

(56) References Cited

U.S. PATENT DOCUMENTS

| | | | |
|---|---|---|---|
| 2010/0142929 A1* | 6/2010 | Itoh | G11B 20/10 |
| | | | 386/241 |
| 2010/0146198 A1* | 6/2010 | Morisetti | H04N 19/172 |
| | | | 711/104 |
| 2011/0099592 A1* | 4/2011 | Kim | H04N 5/781 |
| | | | 725/88 |
| 2012/0128062 A1* | 5/2012 | Mehta | H04N 21/23424 |
| | | | 375/240.02 |
| 2014/0147100 A1 | 5/2014 | Bakharov et al. | |
| 2014/0193138 A1 | 7/2014 | Koren | |

OTHER PUBLICATIONS

International Search Report and Written Opinion for PCT/US2016/65927 dated Mar. 27, 2017.

* cited by examiner

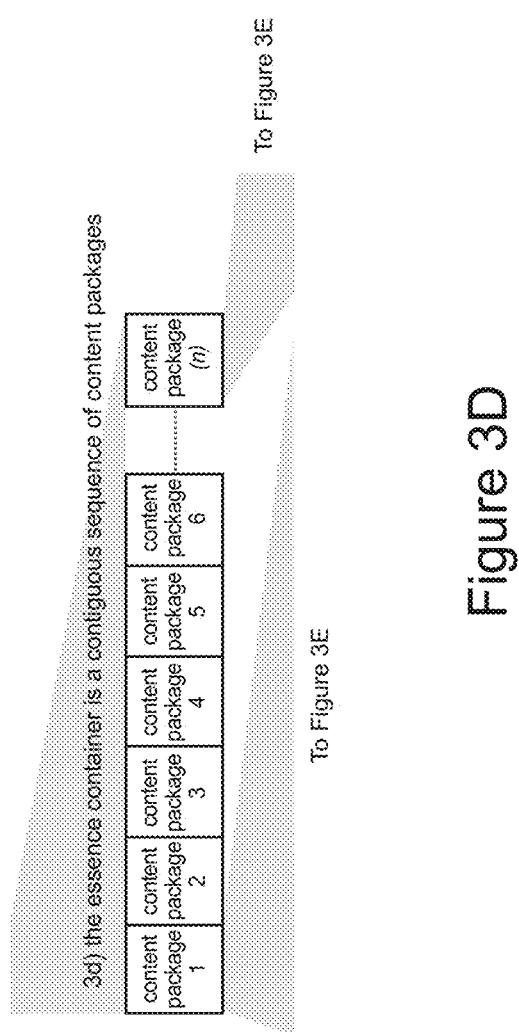

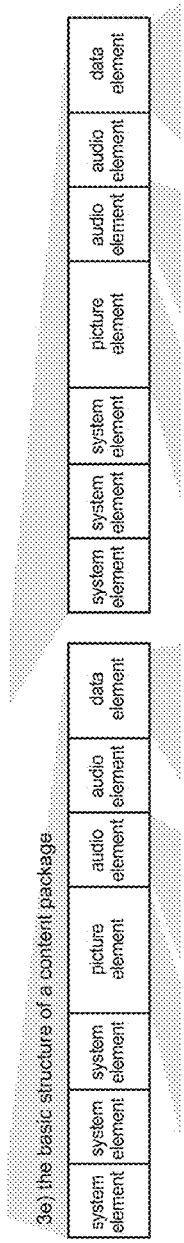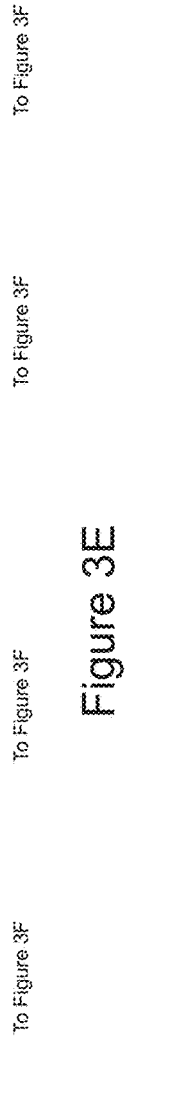
Figure 3E
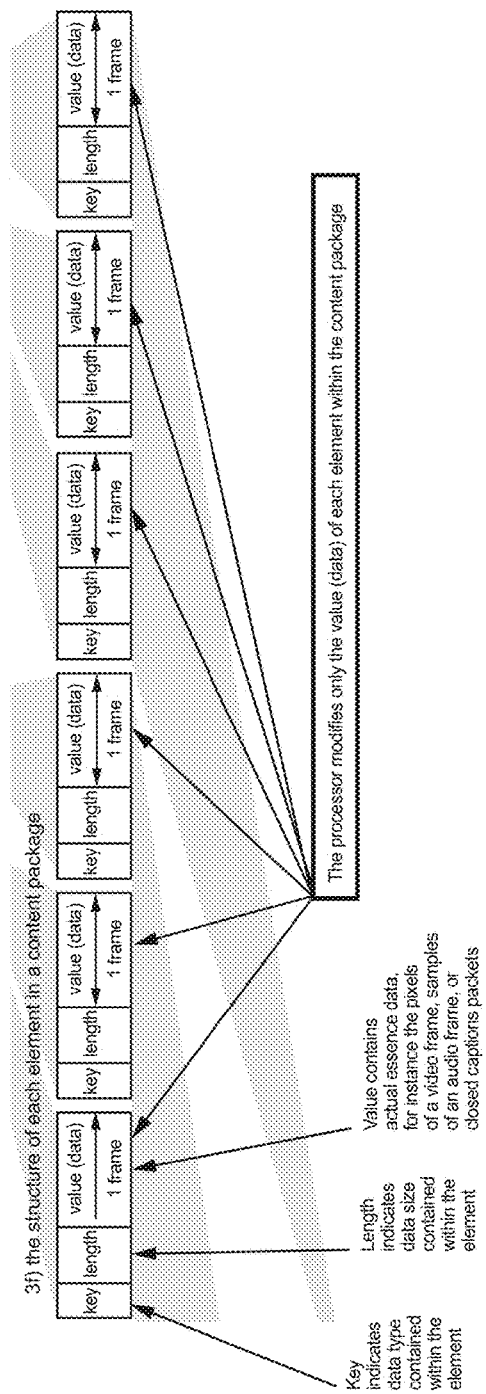
Figure 3F

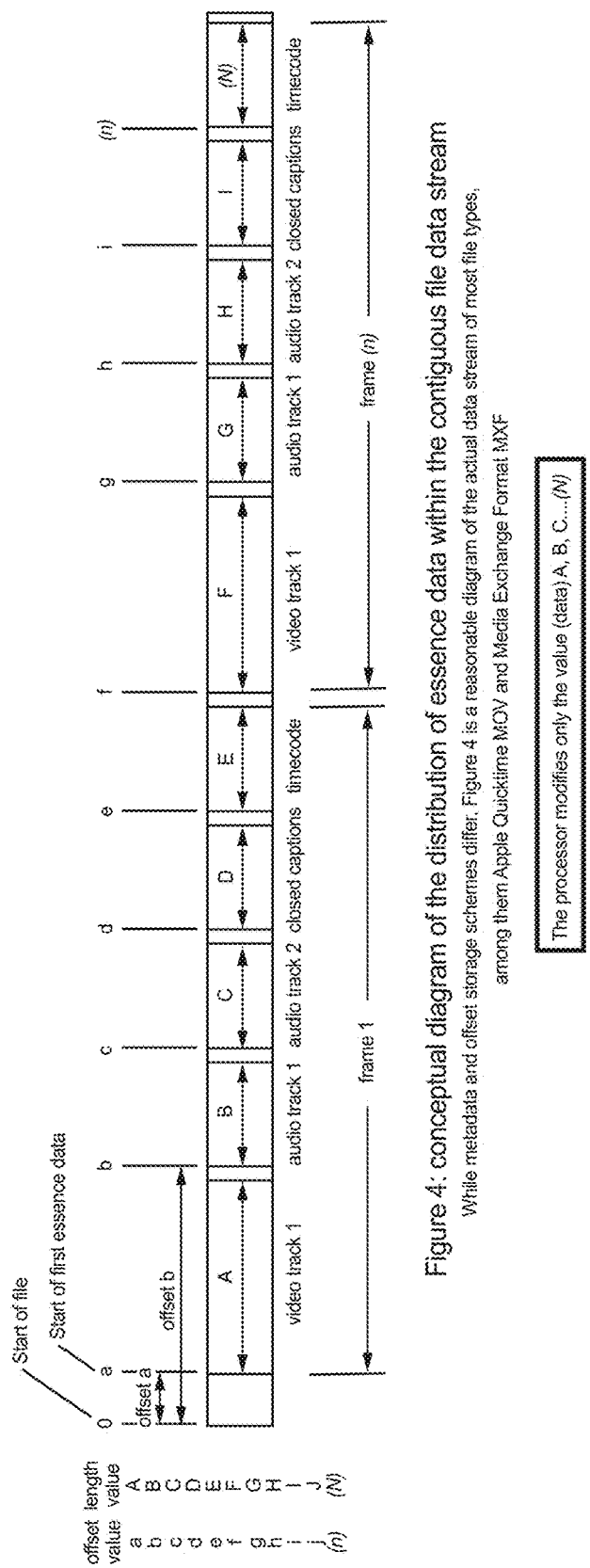

METHOD AND APPARATUS FOR LOW LATENCY NON-LINEAR MEDIA EDITING USING FILE-BASED INSERTS INTO FINALIZED DIGITAL MULTIMEDIA FILES

CROSS-REFERENCE AND PRIORITY CLAIM TO RELATED PATENT APPLICATION

This patent application claims priority to provisional U.S. patent application Ser. No. 62/265,795, filed Dec. 10, 2015, and entitled "Method and Apparatus for Low Latency Non-Linear Media Editing Using File-Based Inserts into Finalized Digital Multimedia Files", the entire disclosure of which is incorporated herein by reference.

INTRODUCTION

In general, non-linear editing (NLE) software operates on a plurality of source multimedia files which are placed adjacent to one another to create a continuous data stream comprised of audio, video, and ancillary data (for instance Closed Captions), singly or in combination, often with additional modification "layers" or "effects" which affect the appearance, sound or other attributes of the multimedia stream(s).

In order to prepare the multimedia stream(s) for playback in third party applications including, e.g., professional and consumer software and devices, conventional NLE software must export the stream(s) in a linear fashion as a single contiguous "finalized" file containing data "essence(s)" organized as tracks in a standard container format using standard compression schemes, i.e., as a "finalized multimedia file" containing multimedia data essence(s). As used herein, "essence" refers to the actual video, audio, and ancillary data, either singly or in combination, as opposed to the container or metadata describing the contained multimedia data. An example of essence data for a video track is the data that makes up the pixels for the video. Examples of essence data for an audio track (or other frame-based media track such as Dolby-E-encode audio or CEA 608/708 Closed Captions) are the samples within such tracks. This and similar editing processes are described in, e.g., US Pat. App. Pub. 20140/147100 and US Pat. App. Pub. 2014/0193138 among others. Some widely known commercial implementations of NLE software are Adobe Premiere, Apple Final Cut Pro and Avid Media Composer.

This final export of the edited media for use in consumer or professional hardware or software for playback or transmission is a time-consuming and resource-intensive process, and in a complex assembly this "export of the finalized file" may take many times "real time". With conventional NLE software, changes to the source media or modification layers by such conventional NLE software then require a re-export of the entire assembly, again requiring the same time/resource intensive process. The reason for this limitation is inherent in the structural approach to the "pipeline" (data manipulation order) that conventional NLE software uses to read/decode and write/encode files. In short, the writing process is entirely separate from the reading process, and the two are not combined with conventional NLE software. This monolithic separation of reading and writing functions by conventional NLE software inhibits its ability to locate and isolate where an insert would take place and subsequently to find and replace the old data with new. Very simply, the writer is unable to find where to write inside the finalized file, and the reader is unable to communicate such to the writer.

As a technical solution to this technical problem in the art, the inventor discloses applied computer technology that performs a file-based "insert edit" that allows changes to data content in a finalized file to be made only to the desired portion of the finalized file without otherwise modifying the finalized file. Accordingly, embodiments described herein combine the attributes of a file reader/encoder with a file writer/decoder so that direct manipulation of the data contents of a finalized file can be achieved by identifying and locating the exact area of the file contents that need to be replaced (read/decode) and replacing them only in the exact area defined (write/encode). Moreover, embodiments of the system may be configured such that the reader/decoder/writer/encoder algorithms correctly identify and otherwise handle a plurality of different multimedia data encoding/decoding and container types appropriately according to the relevant industry standards for the specific container and data types in question.

Until now, closed, finalized multimedia files have been inaccessible for direct editing. This inaccessibility to direct editing has created a barrier in editorial workflow that handicaps efficient program delivery when last-minute changes are required. However, using an example embodiment of the present invention, an editor is able to quickly perform frame-accurate multimedia insert editing into a finalized digital multimedia file. In the iterative process often associated with editorial, legal and quality control approval of finalized files, this can save vast amounts of time and resources as changes can be incorporated in real time or faster via example embodiments of the invention described herein. For instance, in the traditional export-based workflow, a one frame change to a single audio track in a one hour long file still requires the export of the entire finalized file, which might take an hour or more depending on the complexity of the source material. With example embodiments of the invention, however, the same change to the existing finalized file can be made in a small fraction of that time. Additional benefits arising from example embodiments of the invention are reduced quality control review time because only the changed portion of the finalized file needs to be checked since no changes are made to the file outside the affected area and the possibility of new encoding artifacts cannot arise outside the affected area.

Accordingly, a processor programmed as described herein is able to replace any content in any selected region of any specific component (e.g., media track) of a finalized multimedia file obviating the requirement for a re-export of a new finalized file. As an example embodiment, a user can open a file through an NLE or similar application, select "in and out points" and the desired video and/or audio and/or other media or metadata tracks to be replaced, and trigger insert recording to fill the selected area within the respective selected tracks with compatible data from an equivalent track that is coming into an input (such as a Serial Data Interface (SDI) or IP multimedia stream, or the output of a decoded file that can generate compatible multimedia streams directed to the input). Inserts can be video data, audio data, CEA 708 Closed Captions data, Dolby-E data or any other frame-based data, or any mix of individual data types present in the original finalized file.

With example embodiments of the invention, a file reading mechanism is nested within the file writing mechanism and provides the writer with the precise locations of data to be written. Unlike other techniques that approximate an "insert edit", where such techniques consist of editing the metadata (playlist or manifest) of a package-based or playlist-based multimedia wrapper type, when an insert edit is performed in accordance with an example embodiment of the invention, the system is actually writing into and replacing parts of the original finalized multimedia file, specifically the multimedia essence(s). Examples of package-based or playlist-based multimedia wrapper types are an ASMWA AS-02 MXF or an SMPTE IMF MXF file, which contain a manifest with a list of multiple individual files that may be played out together to emulate the appearance of a complete multimedia file and a playlist to organize the start and end times for playout of each individual file within the package. With such wrapper types, performing an edit, where the playlist from time X to Y and package list with media files is edited to include new references to new media files and to play the original media from time X to X+x, then play the new media from X+x to time Y−y, then return to playing the old media from Y−y to Y, involves adding a pointer into the playlist or package that points to the newly added media, which itself must be a finalized file. In essence this approach is a composition of disparate elements (which themselves may be finalized multimedia files or further "playlists" referencing yet other files) manipulated to be perceived as a complete whole. For final delivery to general-purpose consumer playback software or devices, these compositions must be exported by a suitable processor as a finalized multimedia file. A simple analogy is a playlist in a multimedia player such as iTunes. In iTunes, an "album" is simply a playlist or "pointer" to multiple disparate parts: the individual songs. The album itself is virtual, having no physical embodiment of its own beyond the metadata. For the album to truly be a single entity, the constituent parts (individual songs) would need to be combined into a single contiguous file, and it is the operation on a single contiguous file that the invention concerns itself, not the playlist. This means that with example embodiments of the invention, the editing process can make changes on many industry standard, finalized file types as are expected to play in professional and consumer software and devices, such as (but not limited to) ProRes, DNxHD, AVC-I, JPEG 2000, etc., and they can be wrapped in any of a number of industry standard wrapper types such as (but not limited to) Apple Quicktime MOV and various MXF operational patterns such as OpAtom, Op1A, DPP OP1A, AS02, IMF etc. Furthermore, because changes are being written into the original finalized multimedia file, file metadata and compatibility and interoperability with third party applications and devices is maintained. The resulting file after the insert edit is the same file, albeit with the data content of some frames of audio and/or video and/or other data type essences having been replaced.

These and other features and advantages of the present invention will be described hereinafter to those having ordinary skill in the art.

BRIEF DESCRIPTION OF THE DRAWINGS

FIGS. 3A-F and 4 disclose example formats for a finalized media file and container.

DETAILED DESCRIPTION OF EXAMPLE EMBODIMENTS

Figure 1:
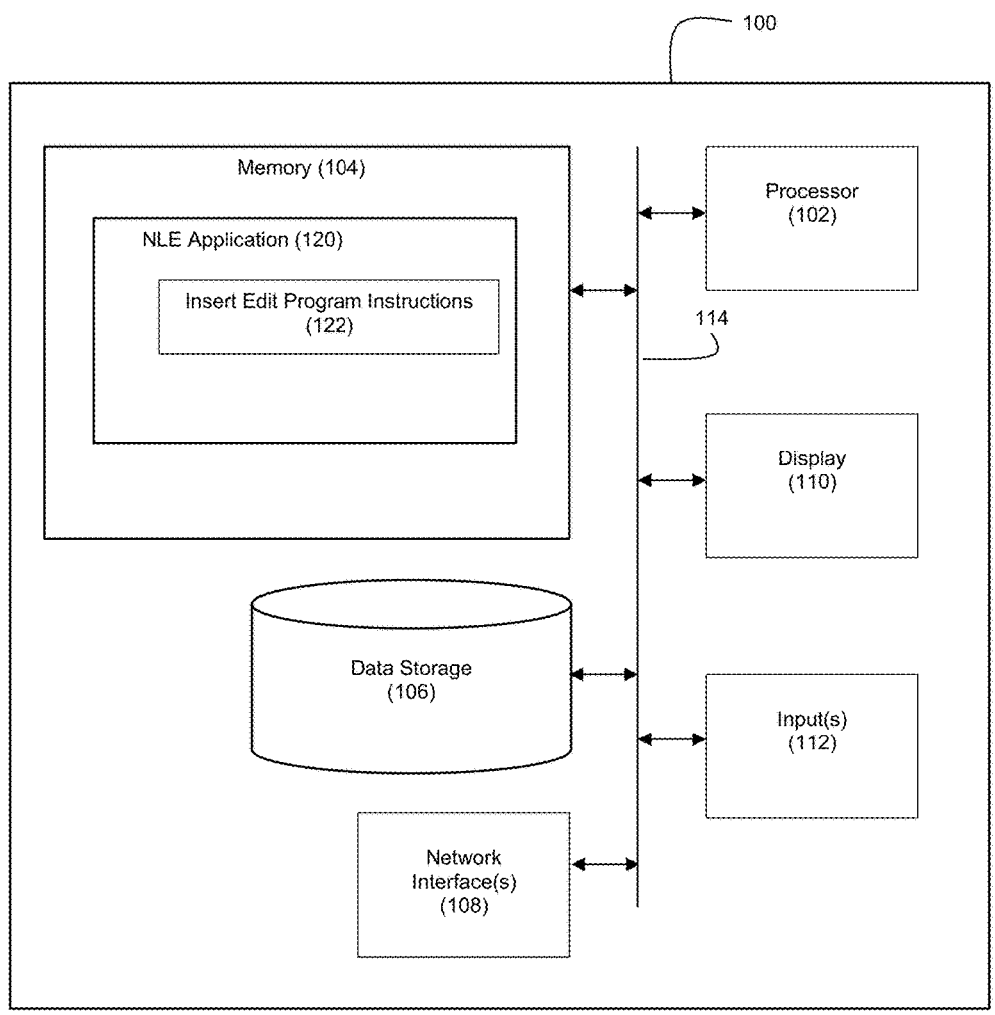
FIG. 1 discloses an example computer system programmed to perform an insert edit process as described herein.

FIG. 1 discloses an example computer system 100 that is specially configured to perform an insert edit process as described herein. The computer system 100 may comprise a processor 102 and memory 104 that cooperate with each other to execute an NLE application 120. The NLE application 120 can be embodied by a plurality of processor-executable instructions resident on a non-transitory computer-readable storage medium such as computer memory 104. In accordance with an example embodiment, the NLE application 120 may include program instructions 122 for carrying out an insert edit process as described herein. While the insert edit program instructions 122 are embedded in an NLE application 120 in an example embodiment, it should be understood that this need not be the case. For example, the insert edit program instructions 122 could be addressed via a command line interface rather than from within an NLE application 120.

The processor 102 can take the form of any hardware data processing component that is capable of performing an insert edit as described herein. For example, the processor 102 may take the form of a microprocessor, CPU, or the like that is capable of executing the instructions described herein. In operation, such a processor 102 can fetch one or more program instructions for the NLE application 120 from memory 104 over bus 114 for execution thereby. As another example, the processor 102 may take the form a field programmable gate array (FPGA) that is loaded with a configuration file designed to perform an insert edit as described herein. It should also be understood that the processor 102 may take the form of multiple processors that cooperate with each other to implement the insert edit as described herein.

The memory 104 can take the form of any memory device capable of storing data and interacting with the processor 102 as described herein. It should be understood that the memory 104 may take the form of multiple memory devices. Together, the processor 102 and memory 104 as described herein can be characterized as a circuit specially configured to perform an insert edit process as described herein.

Figure 5:
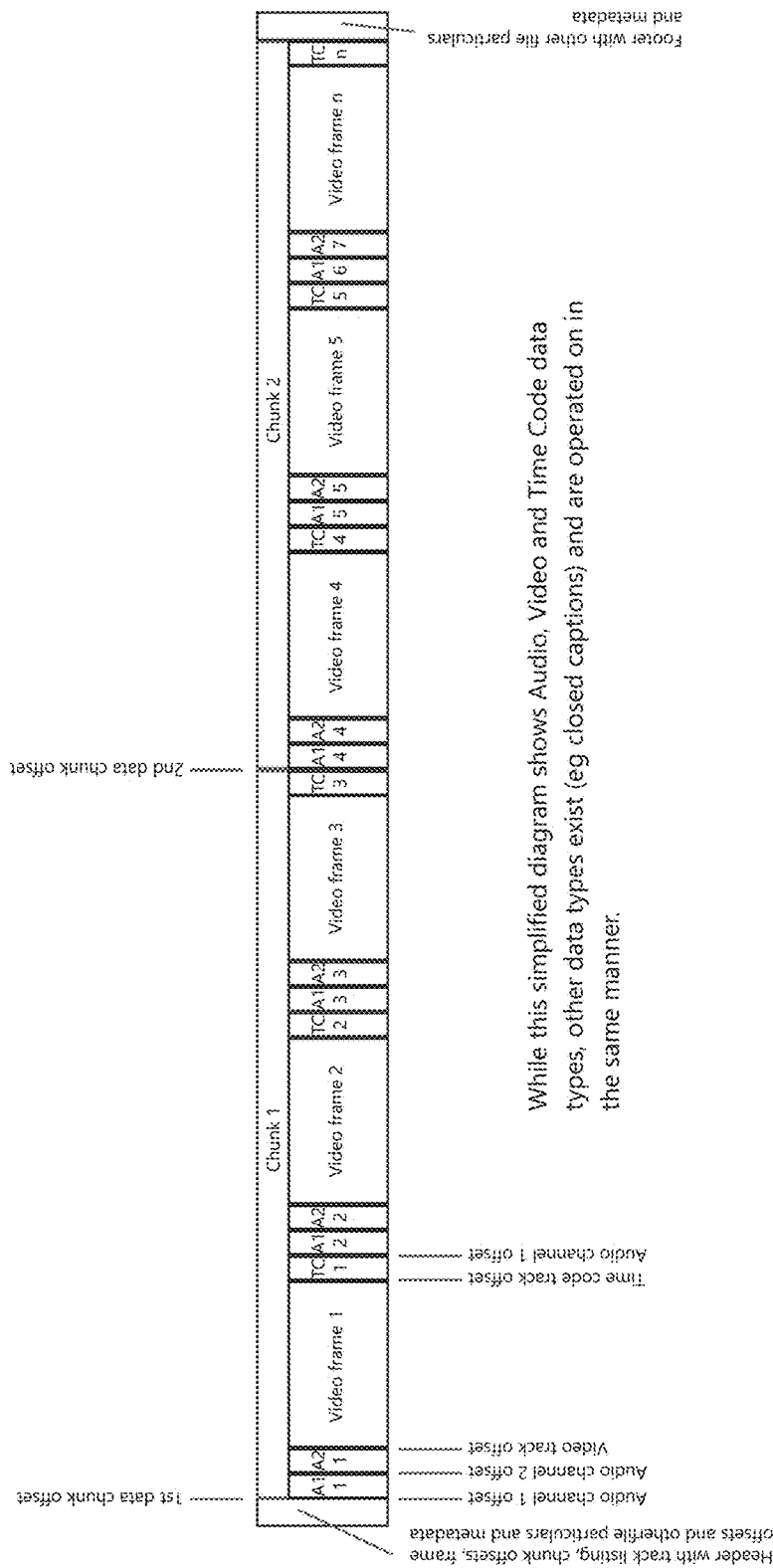
FIG. 5 discloses an example multimedia file structure.

The computer system 100 may also include, by way of example, non-volatile data storage 106 (e.g., a hard disk, etc.) connected to bus 114. Media files may be stored in such data storage for editing by the NLE application 120. FIG. 5 depicts an example multimedia file that shows its organization of interleaved video, audio, and time code frame data. As can be seen, the example multimedia file includes a header, where the header includes a track listing, chunk offsets, frame offsets, and other file particulars and metadata. At various byte offset locations in the media file, audio frames (e.g., audio channels 1 and 2) can be found, video frames can be found, and time code data can be found. It should also be understood that other data type frames may be included in the multimedia file (e.g., closed caption frames). Examples of multimedia file types that can be processed using the inventive insert edit techniques described herein include the Media Exchange Format (MXF), Apple Quicktime format (MOV), and Audio Video Interleave (AVI) format. The computer system 100 may also include one or more network interfaces 108, through which the computer system can receive data and media files from remote sources via a network. Further still, the computer system 100 may include a display 110 (e.g., a monitor) and input(s) 112 (e.g., a keyboard, mouse, etc.) for interacting with users.

Figure 2:
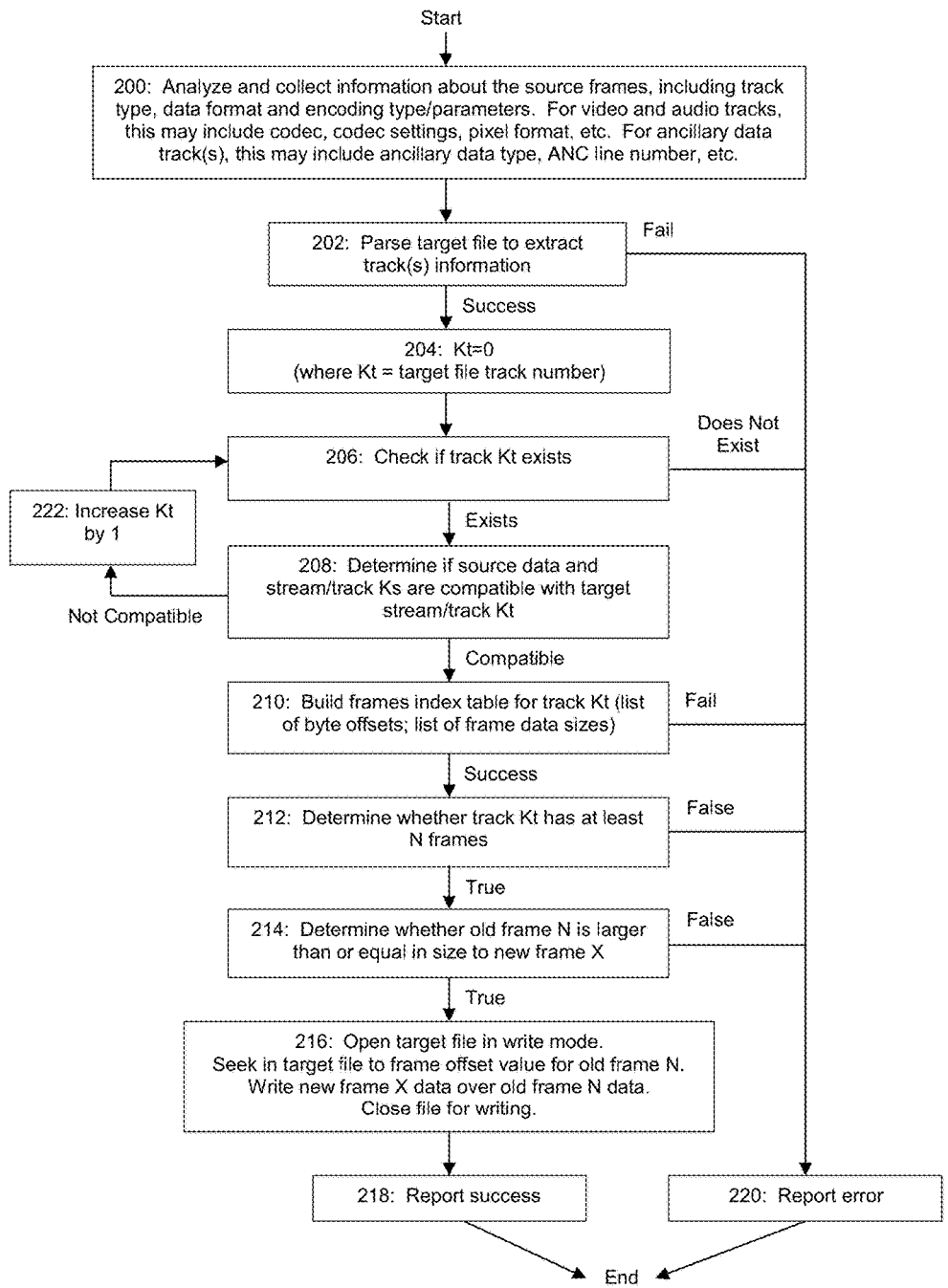
FIG. 2 discloses an example process flow for an example embodiment of an insert edit process as described herein.

FIG. 2 discloses an example process flow embodied by insert edit program instructions 122 in accordance with an example embodiment of the invention. With this example embodiment, the insert edit process operates to replace data in a closed, complete "finalized file" to "insert edit" in the context of replacing video/audio/ancillary essence data in a multimedia file that has such data essences packaged in industry-standard multimedia container formats (aka "wrappers") such as Apple Quicktime MOV and various types of MXF as described in standards published by, e.g., Apple Computer or the Society of Motion Picture & Television Engineers (SMPTE) or other standards published by, e.g., the Institute of Electrical and Electronics Engineers (IEEE) and other such broadcast television, cinema or similar international standards bodies and government or private entities.

For an insert edit, it will be assumed that a user desires to replace old Frame #N of data type A with new Frame #X of data type A in an appropriate track of type A in a finalized digital multimedia file. It will also be assumed that everything about the new frame to be inserted (e.g., its resolution, encoding algorithm, color space of raw frame, frame type (interlaced or progressive), or other data type identification is known by decoding and parsing the new file/frame using such standards as described above. Further still, it will be assumed that a user has identified via an NLE editing application or the like one or more frames of a finalized digital multimedia file (the target file) that are to be replaced with one or more new frames from some source, which could be "live" via SDI or other raw transport method, another finalized file, or the typical contents of an NLE project as described in the introduction.

Figure 6:
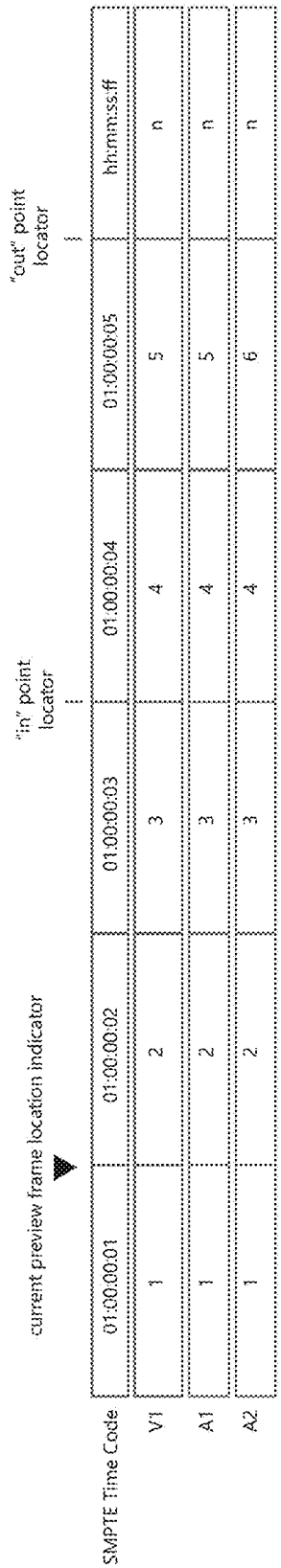
FIG. 6 discloses an example NLE representation of the multimedia file of FIG. 5, including "in" and "out" point edit locations.
Figure 7:
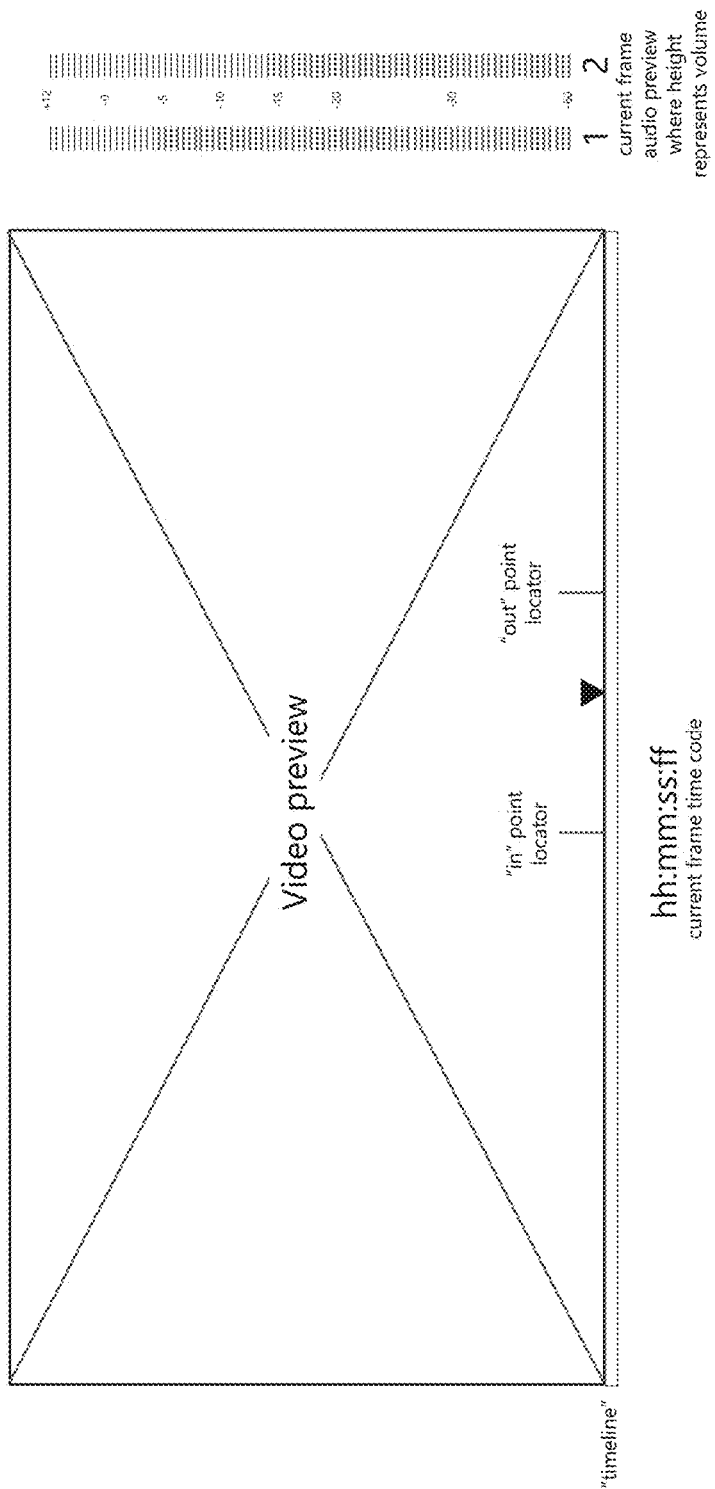
FIG. 7 discloses an example NLE user interface for the multimedia file of FIGS. 5 and 6.

In an example embodiment, the user identifies a source file by opening a file in a "source player" in the NLE application, which includes tools the user may use to identify the first and last frames of the insert, known in editing parlance as the "in" and "out" points. FIG. 6 shows an example of a typical NLE "timeline" representation of video and audio tracks from a multimedia file such as the one shown by FIG. 5. In this example, a top row shows a sequence of the SMPTE time codes for the file, and additional rows show the corresponding frames for a video track (V1) and audio tracks (A1 and A2) for each timecode. The "in" and "out" points are shown in relation to their corresponding time codes as well as video and audio frames. FIG. 7 shows an example user interface for selecting the "in" and "out" points to define the start and end points of an insert edit. A timeline below the video preview window shows where the user sets the "in" and "out" pointers, and a pointer shows where along the timeline the current video frame and audio frames are located.

Figure 8:
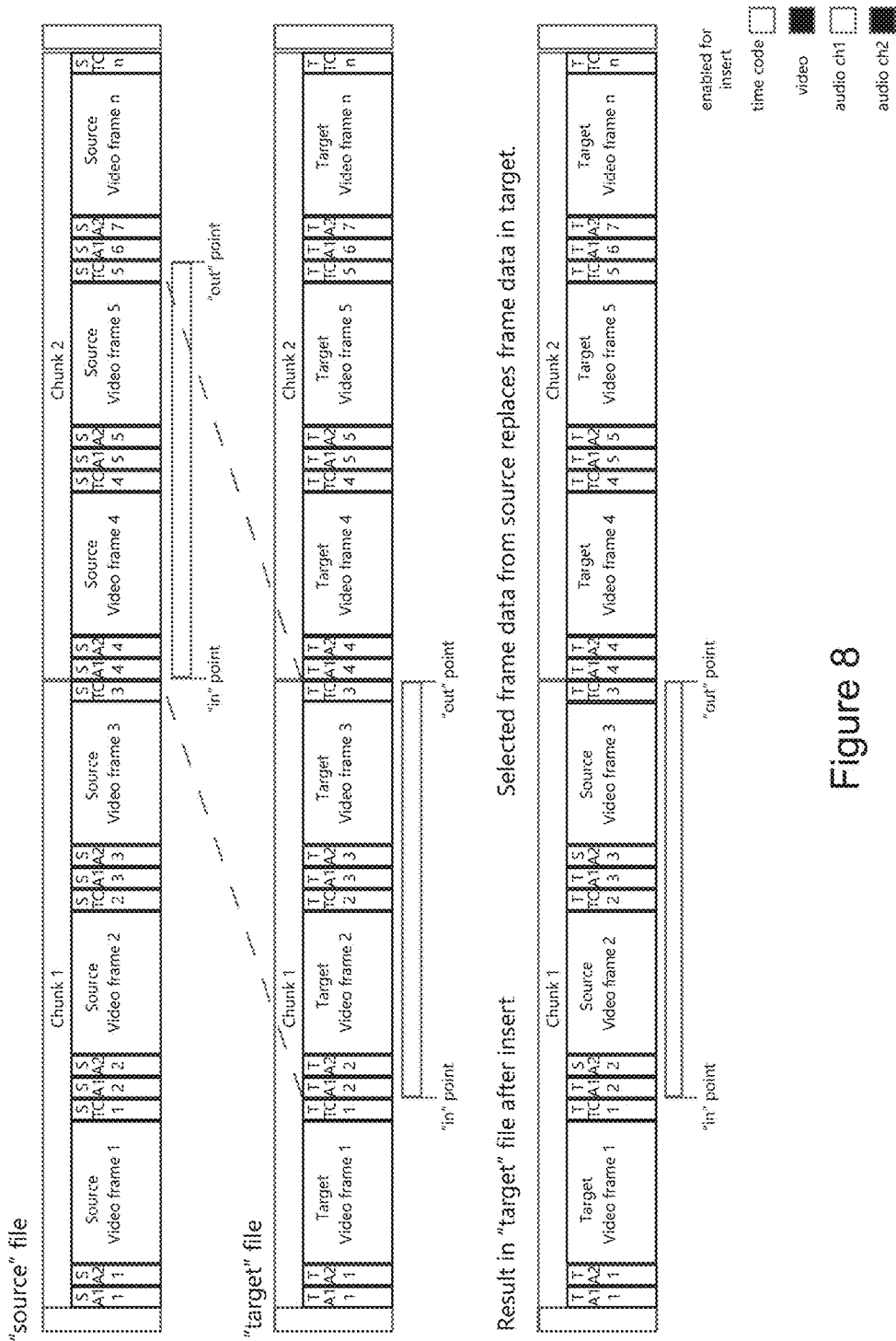
FIG. 8 discloses an example diagram of an insert edit with respect to a source file and a target file.
Figure 9:
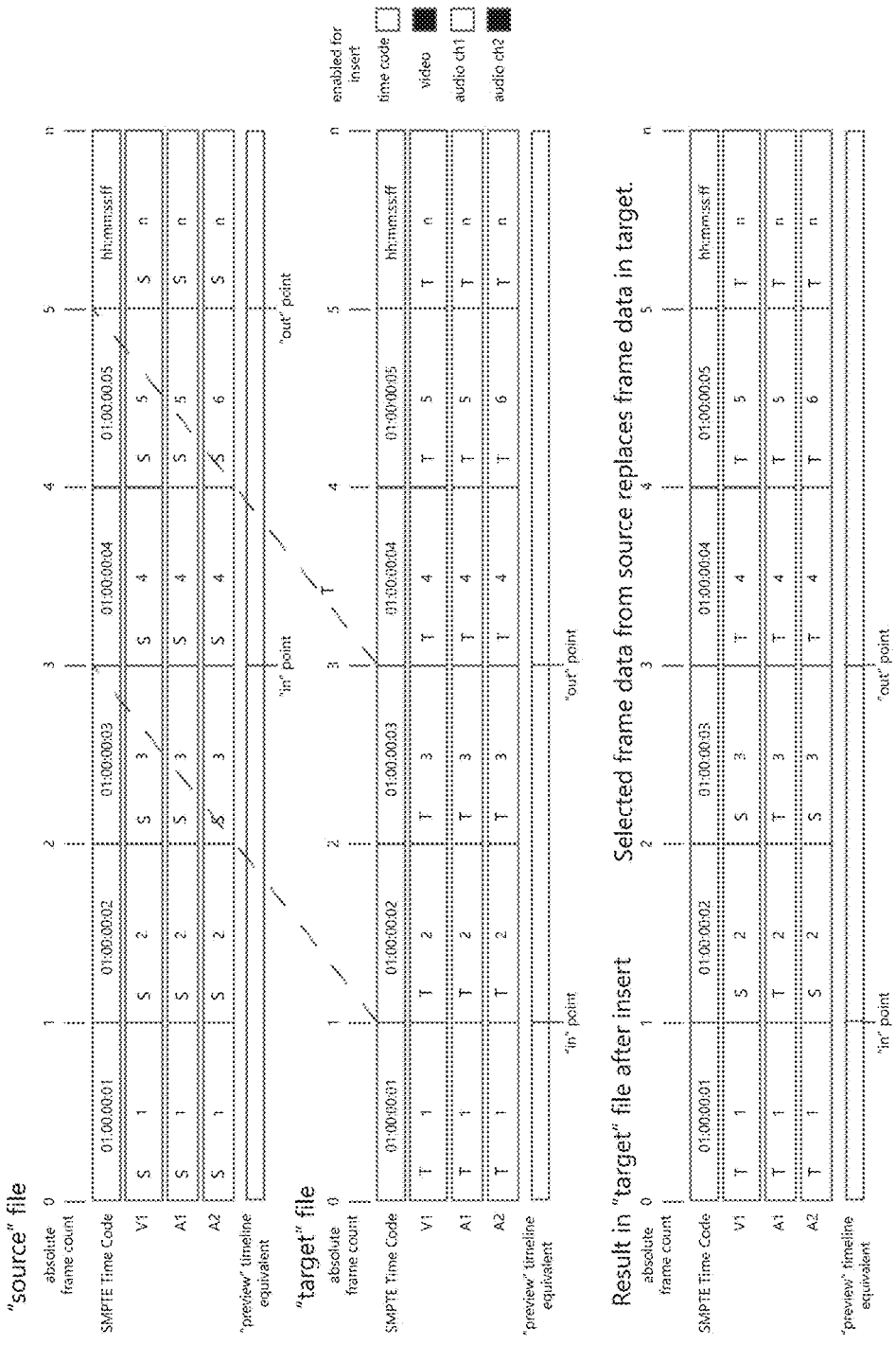
FIG. 9 discloses an example NLE representation of the insert edit shown by FIG. 8.
Figure 10:
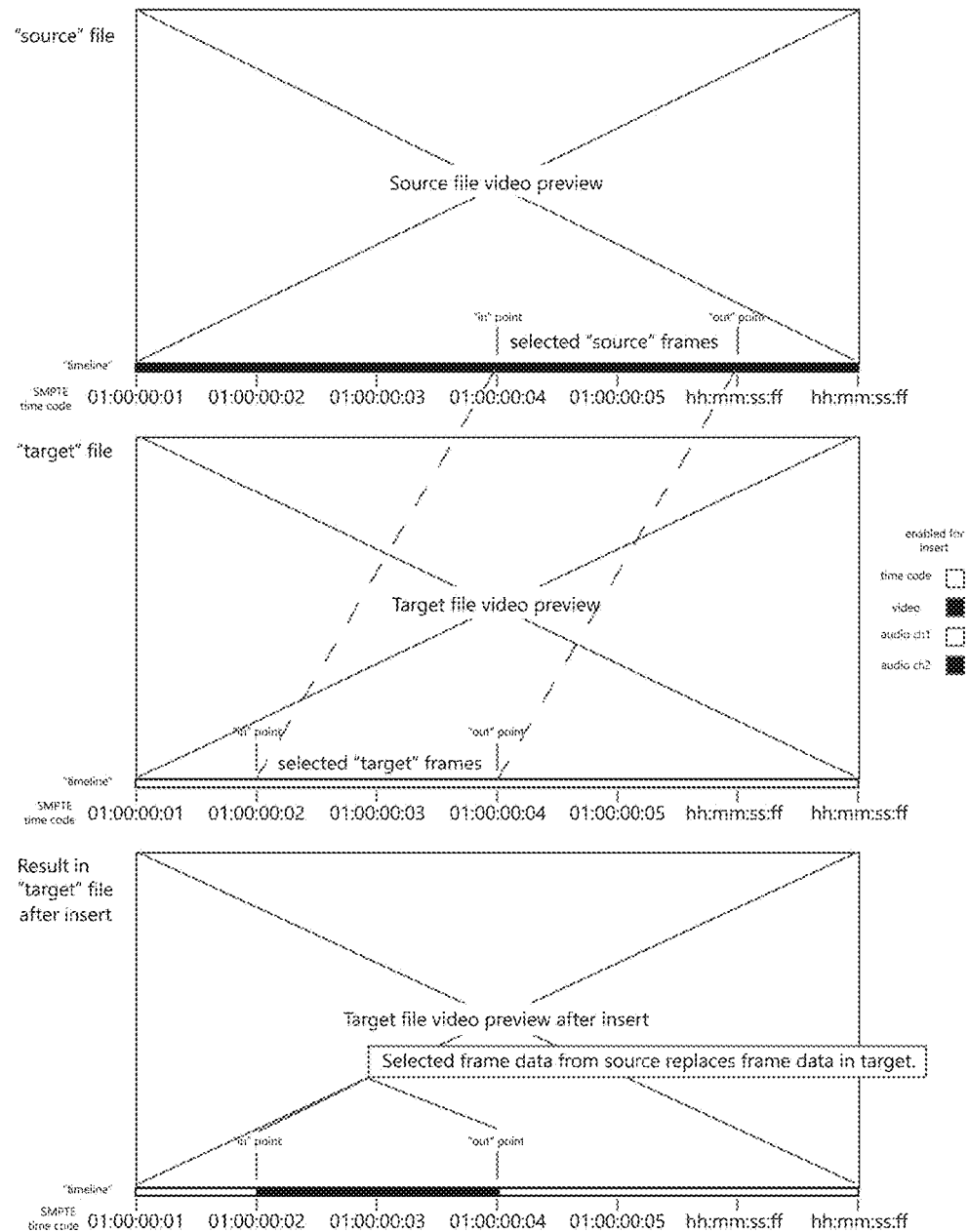
FIG. 10 discloses an example NLE user interface for the multimedia file of FIGS. 8 and 9.

The user then opens the target file in the "target player/writer" and performs the same operation setting in and out points. In both cases, the "player" incorporates a decoder capable of reading/decoding both the wrapper and content contained in the wrapper. A principle known as "3 point edit" is applied to the user in/out points to ensure that the duration in both cases is identical. The $4^{th}$ point is generated from the duration explicit in the first in/out pair selected, regardless of whether the first pair is selected in the source or target player. When the $3^{rd}$ point is selected, the remaining in or out point is calculated from that point plus or minus the duration, depending on whether the in or out point is selected, respectively. Subsequently, the user identifies the desired tracks within the source to be used as sources in the desired tracks within the target. Another, simpler embodiment is a script which identifies the source file and tracks, the target file and tracks, and a start and end timecode for each file, then operated upon in an identical manner by the processor. FIG. 8 shows an example that relates a source file to a target file with respect to an insert edit that replaces various video and audio channel 2 frames of a target multimedia file with various video and audio channel 2 frames of a source multimedia file. The resultant edited target file is shown at the bottom of FIG. 8, where two selected video frames and two audio channel 2 frames from the source file have replaced two selected video and audio channel 2 frames in the original target file. FIG. 9 shows an NLE representation of the insert edit shown by FIG. 8, where the subject files are broken down into their respective video, audio channel 1, and audio channel 2 tracks, each shown in correspondence with the SMPTE time codes. FIG. 10 shows an example user interface for the edits of FIGS. 8 and 9.

While FIGS. 5-10 show examples where the multimedia files include video, audio channel 1, and audio channel 2 frames, it should be understood that the files can also include frames for other data types (e.g., closed captions data), and these other frames could be edited in the same manner as described above for the video and audio frames.

Figure 3A:
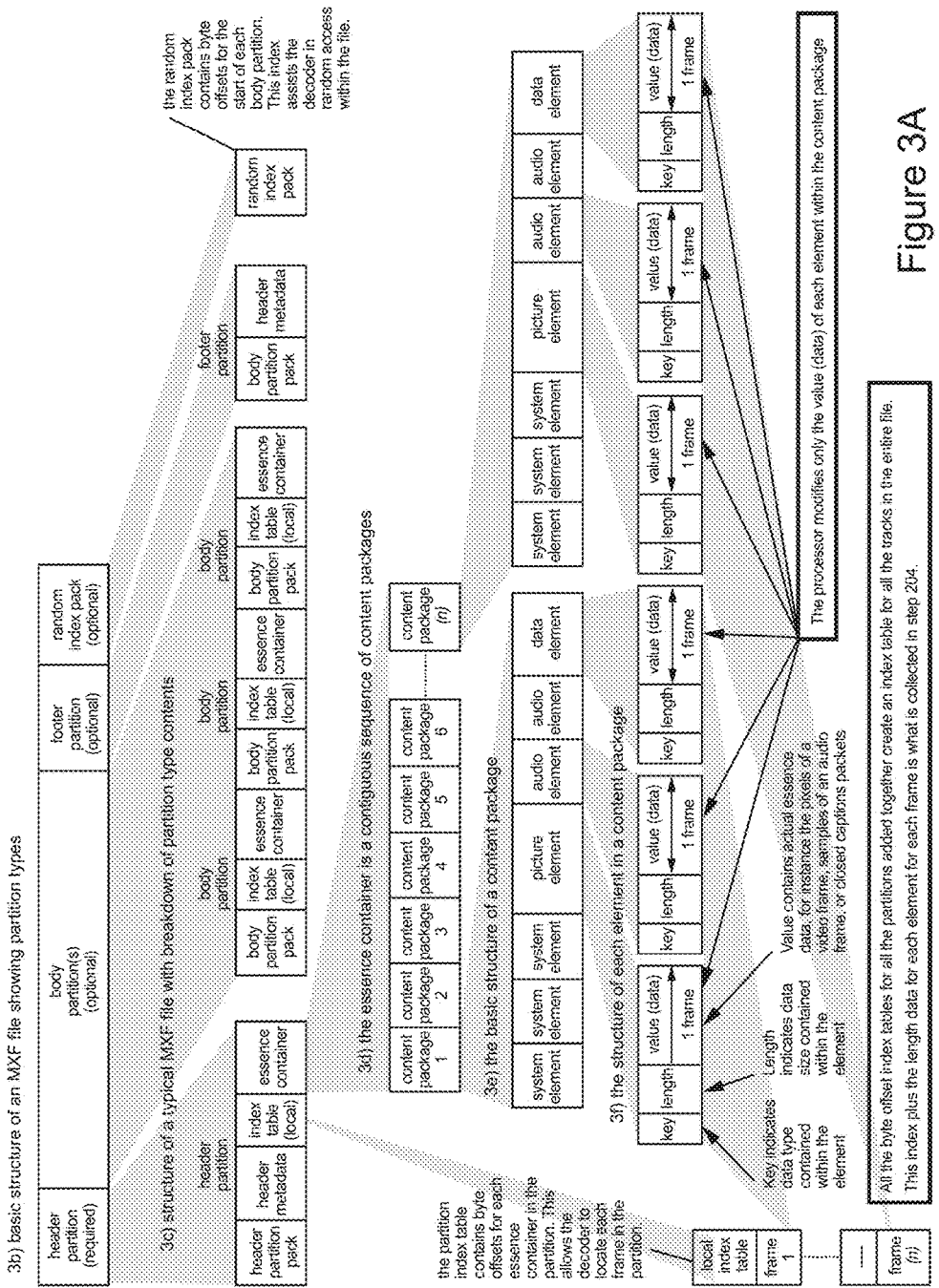
Figure 3B:
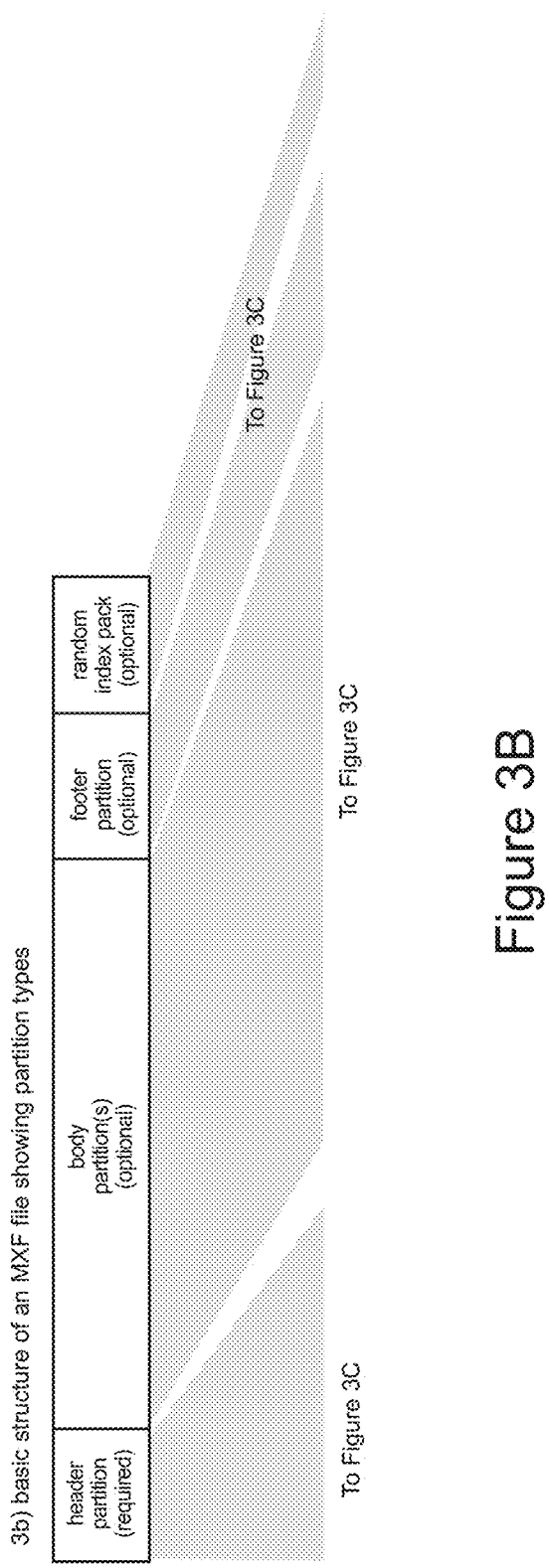
Figure 3C:
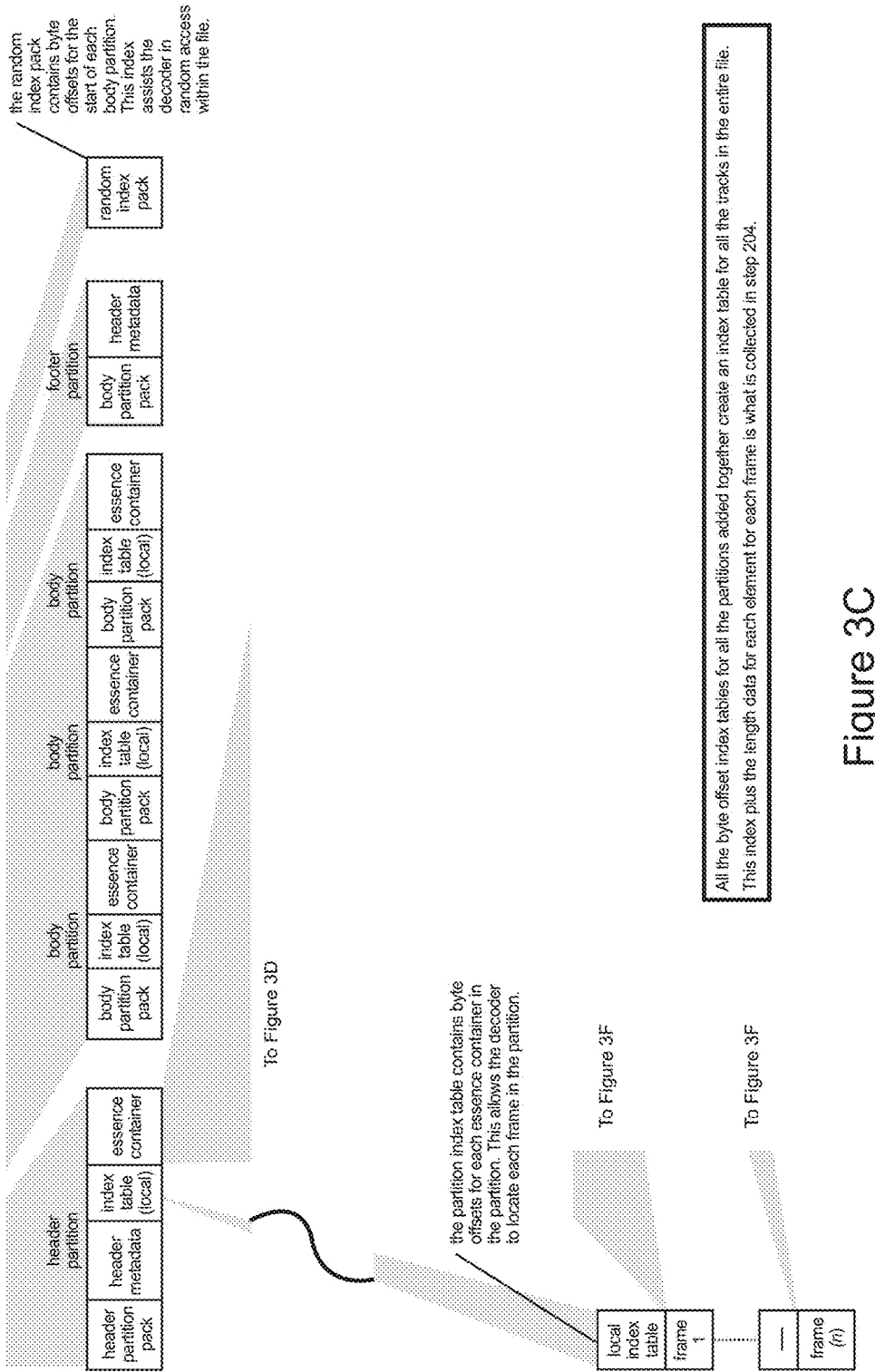

Accordingly, in general, a digital multimedia file to be edited will comprise a plurality of media tracks, with each track comprising one or more frames that constitute the essence data. FIG. 3A shows an example arrangement for the basic structure of an MXF file. FIGS. 3B-3F show zoomed in portions of FIG. 3A. FIG. 3B shows an example structure for a typical MXF file including partition types. FIG. 3C shows an example MXF file structure with a breakdown of partition type contents. FIG. 3D shows an example essence container as a contiguous sequence of content packages. FIG. 3E shows an example structure of a content package. FIG. 3F shows the structure of the content packages, and identifies the actual data upon which the processor operates. FIG. 4 shows an example diagram of the distribution of essence data within a contiguous file stream.

At step 200, the process flow begins by analyzing and collecting information about the new frames of data from a selected multimedia source to be inserted into the finalized file. The multimedia source data can take the form of decoded contents of other multimedia file(s) whether or not in the context of NLE software, a Serial Data Interface (SDI) stream, or other data stream containing such frame-based multimedia data. The collected and analyzed information for the new frames can include information such as track type (e.g., audio, video, or ancillary data), data format, and encoding type/parameters. For video and audio tracks, this information may include codec, codec settings, pixel format, etc. For ancillary data track(s), this may include ancillary data type, e.g., CEA 608/708 Closed Captions, ANC line number, etc. Step 200 extracts this data from metadata contained in the headers, footers, and other specific locations defined in the container format (wrapper) or, when not present in the wrapper or if the source media exists in a transport stream such as HDSDI, from metadata that is contained in the header portion of the actual frame data itself, for example in the packet header of a Closed Captions packet as defined by CEA 708/SMPTE 334M. The exact process for parsing each container type and data type within the container is documented by one or more internationally recognized bodies, for instance the Society of Motion Picture & Television Engineers (SMPTE) and are available either publicly or by subscription, or in the case of, e.g., proprietary compression schemes, available to licensees of such proprietary information.

Next, at step 202, the processor parses the finalized (target) file selected by the user by analyzing and collecting information about the frames of data in the finalized file. As with step 200, the analyzed and collected information can include track type (audio, video, ancillary data), data format and encoding type/parameters. The analyzed and collected information about the file with frames-to-be-replaced can further include the track index number (which specific track among the tracks of the finalized file contain the frames-to-be-replaced). The same parsing techniques used at step 200 can be used at step 202. Each container for a finalized file will have an associated parsing algorithm defined by the container provider or a standard. In the event that all of the needed stream information cannot be learned from the container metadata, it may be necessary to read the first frame of the actual track data essence, for instance video data, in order to extract the needed information from the frame header. For instance, a certain minimum amount of information (metadata) about the contents of a multimedia file is contained in the wrapper header or footers, and in certain cases in special packets located throughout the file (e.g., in some MXF operational patterns) so that an application needing to decode the file can by following the standard "know" where to look for such information as an aid to decoding the file. Where such metadata is incomplete or inaccurate, inspection of the actual frame data may fill in the missing required information about the contents of the frame so that the application can correctly decode the contents of the file. The parsing at step 202 may produce information about both the entire finalized file as well as the individual tracks in the finalized file by parsing the file headers/footers and, when necessary, certain individual frames within the finalized file. The essential purpose of this data collection is to ensure that the source and target files contain compatible streams.

If the parsing at step 202 fails, for example the finalized file is unreadable or has damaged metadata or other data, or is an unsupported file type or is a supported file type with unsupported content, the process flow proceeds to step 220 to report an error. Otherwise, if parsing at step 202 is successful, the process flow proceeds to step 204.

At step 204, the process flow initializes index Kt to zero, where Kt is an index that represents the track number K in the finalized (target) file that is to receive the insertion. At step 206, the processor checks whether track Kt exists based on the information extracted in step 202. The reason for this check is that the input from the user about which track should be modified and that track's source is checked against the actual parsed data of the file to ensure that the desired track with the correct characteristics for the actual input data stream actually exists in the target file. If track Kt does not exist, the process flow proceeds to step 220 to report an error. Otherwise, the process flow proceeds to step 208.

At step 208, the processor determines whether the source data and stream/track Ks are compatible with target stream/track Kt by comparing the data extracted at steps 200 and 202. As a first part of this compatibility check, the processor checks to see if track Kt is the track that was targeted for replacement by track Ks. If not, the process flow goes to step 222 to iterate to the next track. If track Kt is the track targeted for replacement by track Ks, then step 208 continues its assessment as to whether the source data and stream/track Ks is compatible with target stream/track Kt. If there is compatibility, then the process flow proceeds to step 210. If there is not compatibility, for instance if Ks contains a different data type than Kt, the process flow proceeds to step 222, where Kt is incremented by 1 to check for the next track Kt+1 (returning to step 206).

Steps 204-208 operate to render the information obtained in step 202 (parsing file according to standard) into a format conducive to the further needs of the processor (the results of 202, which are delivered in a format defined by the standard, are parsed into an orderly data structure for the insert edit.)

The information used for the compatibility check may include but not be limited to:
  For Audio—sample rate, sample bit rate, track type (e.g., mono, stereo, interleaved)
  For Video—resolution, pixel format, pixel bit depth, pixel aspect ratio, SMPTE color range, transfer characteristics, frame type (progressive or interlaced), field dominance for interlaced material, track type (e.g., single, stereo 3D, etc.), track duration, delay values, editing ratio (aka frame rate)
  For Timecode—Track type, standard, track duration
  For Closed Captions—Standard, packet type, track duration.
  For other ancillary data—Packet type and standard referenced, track duration Since from step 200, the processor knows the equivalent information about the new frame, the processor is able to compare the results of steps 200 and 202 to assess compatibility between the source and target frames. Two frames are deemed compatible when there is an exact data format and data size match for all fields required by the target file's wrapper and encoder specifications, for example for video: resolution, pixel format, bit depth; for audio: sample rate, bit rate and bit depth. The exact list of matches will vary depending on the particular wrapper and encoders required for the particular target file. In general they can be said to include at minimum those listed above in this section.

The interleaved nature of multimedia files requires that, once a file is finalized, each frame of data is of a fixed size and cannot exceed the size allocated to it at the original writing time. This then requires that each new frame for each track must take up no more than the data size of the existing frame or it will interfere with (overwrite) the next frame of the data. In the case that the new data is smaller than the old data, an error is not generated and the resultant "left over" space is filled with "padding", or data present but "hidden" from the container and thus from any software decoding the container. Optionally the processor may use format conversion routines to ensure compatibility of the streams, for example "sample rate conversion" on audio data where direct write of the source data would be incompatible with the target data track and file metadata. An example would be decoded 96 Khz audio converted before writing to 48 Khz audio to match the target file's audio specification.

At step 210, the processor opens the target file in read mode using the incorporated reader module and builds a data structure that identifies where the various frames are located in the target file (e.g., a frames index table) for track Kt. Since the task is to replace frame N in the finalized file, the processor needs to know the exact byte offset of any frame in that file as well as the number of frames in the file.—a first list that contains the offset of each frame in the finalized file and a second list that identifies the data size of each frame, for the total number of frames in the finalized file. This process can be generalized as locating the position of each frame as an offset from the 0 position of the essence stream(s) in the file. The exact algorithm and process for extracting frame counts, offsets and frame sizes is defined and documented by the container provider or standard and varies according to the specific standard(s) in question, and both container format and compression scheme may influence the method.

If step 210 results in successfully building the frames index table, then the process flow proceeds to step 212. Otherwise, the process flow proceeds to step 220 to report an error. At step 212, the processor determines whether track Kt has at least N frames. This determination can be made by comparing the number of frames in the target file based on the file metadata to the frame position specified by the user for the insert. For example, if the user has specified that frames 100-110 of track Ks should be inserted, and the parser determines from the file metadata extracted in step 202 that track Kt contains at least 110 frames, the insert can proceed, otherwise an error is generated. If the frame count for track Kt is less than N, then the process flow proceeds to step 220 to report an error. Using the example above, if the user specified that frames 100-110 should be inserted, and the target track Kt only contains 95 frames, the insert would result in an attempt to write to a non-existent location in the target file, thus generating an error.

As should be understood, step 212 as described above would be for operation when frames are being inserted on absolute basis. If the start and end time codes for the insert land at the same absolute frame numbers, counting from zero (e.g., from Frames 100-110 in the target file (again, counting from zero)), then the target file must have at least 110 frames. However, if the start and end times are relative, then only 11 frames would be needed (e.g., insert frames 100-110 from the source to frames 0-10 in the target). Thus, if the numbering is relative, it should be understood that step 212 can check to ensure that the count of frames being inserted matches the count of frames being replaced.

In either case (absolute or relative) for an example embodiment, the user would indicate in a user interface the start and end points of the insert in terms of SMPTE time code which is converted to absolute frame counts. The starting point and ending point are arbitrary within the boundaries of the file, although one or the other of start/end points is constrained by the total duration. If either fall outside the boundaries of the file, e.g., result in a start less than zero or an end greater than the last frame, then the user interface would tell the user that the area-to-replace falls outside the boundaries of the file-to-be-inserted.

At step 214, the processor determines whether old frame #N is larger than or equal in size to new frame #X. This can be performed by referencing the frame size fields associated with the two frames in the list generated at step 210. If the old frame is larger than (or equal in size to) the new frame, then the process flow can proceed with replacing the old frame with the new frame (step 216). If the new frame is larger than the old frame, this would represent an error because the larger new frame would break the file structure. Due to the interleaved and continuous nature of the frame data, If Xs>Nt, Xs would overwrite the succeeding data belonging to frame Yt. In the case of a smaller frame, such overwriting would not occur, and the resultant "left over" space is filled with "padding", or data present but "hidden" from the container and thus from any software decoding the container. For an example alternative embodiment, a refinement of the method would be, given a suitably flexible encoding processor, to re-encode the source frame in such a way that it exactly matches the space available, though this may not be appropriate in the primary scenario where the driving concept is to exactly replicate the encoding quality and other attributes of the original media. In such an event, the process flow proceeds to step 220 to report an error.

At step 216, the processor opens the target file in write mode, and the seeks in the target file to the frame offset value for old frame #Nt. The processor can reference the offsets list built at step 210 to support this operation. Once it locates the offset for frame #N, the processor can write new frame #Xs data over the old frame #Nt data. The target file can then be closed for writing. In this fashion, Frame #Xs can be inserted into a finalized file in place of Frame #N without requiring a re-export of the entire finalized file. A benefit of the insert edit approach of the example embodiment of FIG. 2 is that no other data adjustment to the finalized file is required or desirable—only the actual multimedia content is altered for only the selected area of the target finalized file. Furthermore, as should be appreciated the internal structure of the finalized file (i.e., the positioning, ordering, and layout of the frames and metadata within the finalized file) is unchanged after the insert edit in accordance with the inventive techniques described herein.

Furthermore, as should be understood from the description above, if the user has specified that frames 100-110 of track Ks should be inserted, then steps 200, 208, and 212-216 can be performed for each of the frames-to-be-inserted. In such an instance, the frames index table can be leveraged to find the byte offsets for each frame in the target file that is to be replaced by the specified frames 100-110 of track Ks. Step 216, accordingly, can write the frames-to-be-inserted over the frames-to-be-replaced at the locations in the target finalized file corresponding to those byte offsets.

Further still, while various example embodiments are described herein with reference to editing MXF files, it should be understood (as noted above), that the inventive insert edit techniques can also be applied to other multimedia file types such as MOV, AVI, etc. utilizing analogous file features within those types during the processing (e.g., essence keys with respect to MXF files become atoms with respect to MOV files).

While the present invention has been described above in relation to its exemplary embodiments, various modifications may be made thereto that still fall within the invention's scope. Such modifications to the invention will be recognizable upon review of the teachings herein.

What is claimed is:

1. A method for editing a finalized digital multimedia file, wherein the finalized digital multimedia file comprises a plurality of frames that serve as media content for the finalized digital multimedia file, the method comprising:

a processor parsing and extracting metadata about a frame-to-be-replaced in the finalized digital multimedia file and a frame-to-be-inserted into the finalized digital multimedia file;

a processor determining whether the frame-to-be-replaced and the frame-to-be-inserted are compatible with respect to data size and data format based on the parsed and extracted metadata;

a processor building a data structure that identifies where the frames in the finalized digital multimedia file are located within the finalized digital multimedia file; and in response to a determination that the frame-to-be-replaced and the frame-to-be-inserted are compatible, a processor (1) identifying a location in the finalized digital multimedia file for the frame-to-be-replaced based on the data structure, and (2) directly editing the finalized digital multimedia file by writing over the frame-to-be-replaced with the frame-to-be-inserted at the identified location; and wherein the frame-to-be-replaced and the frame-to-be-inserted comprise video frames, and wherein the compatibility determining step comprises checking for compatibility with respect to resolution, pixel format, and bit depth as between the frame-to-be-replaced and the frame-to-be-inserted.

2. The method of claim 1 wherein the directly editing step comprises writing over the frame-to-be-replaced with the frame-to-be-inserted at the identified location without otherwise altering the finalized digital multimedia file.

3. The method of claim 2 further comprising performing the method steps without re-exporting the edited finalized digital multimedia file.

4. The method of claim 3 wherein the writing step comprises:
a processor (1) opening the finalized digital multimedia file in a write mode, (2) while in the write mode, (i) seeking to the identified location in the opened finalized digital multimedia file, and (ii) writing the frame-to-be-inserted into the opened finalized digital multimedia file at the identified location to thereby directly edit the opened finalized digital multimedia file by replacement of the frame-to-be-replaced, and (3) closing the edited finalized digital multimedia file.

5. The method of claim 4 further comprising:
a processor determining whether the frame-to-be-replaced is larger than the frame-to-be-inserted;
in response to a determination that the frame frame-to-be-replaced is larger than the frame-to-be-inserted, a processor (1) filling the frame-to-be-inserted with padding until the frame-to-be-inserted is the same size as the frame-to-be-replaced, and (2) performing the writing step using the padded frame-to-be-inserted;
in response to a determination that the frame frame-to-be-replaced is the same size as the frame-to-be-inserted, a processor performing the writing step; and
in response to a determination that the frame frame-to-be-replaced is smaller than the frame-to-be-inserted, a processor returning an error.

6. The method of claim 3 wherein the finalized digital multimedia file comprises file metadata and essence data, the essence data comprising the frames;
wherein the compatibility determining step comprises a processor determining whether the frame-to-be-replaced and the frame-to-be-inserted are compatible based on the file metadata; and
wherein the building step comprises a processor building the data structure with respect to the finalized digital multimedia file based on the file metadata.

7. The method of claim 6 wherein the finalized digital multimedia file is embodied as a sequence of bytes, the byte sequence comprising a plurality of essence containers in which the essence data is located, each of a plurality of the essence containers comprising a sequence of content packages, each of a plurality of the content packages comprising a plurality of content package elements for a plurality of data types, the data types comprising a picture element type, an audio element type, and an ancillary data element type;
wherein each of a plurality of the content package elements comprises a (1) a key field that comprises data indicative of the data type for that content package element, (2) a length field that comprises data indicative of a length for a frame within that content package element, and (3) the frame for that content package element;
wherein the building step comprises a processor reading the length fields of the content package elements to support the building step; and
wherein the compatibility determining step comprises a processor requiring a data type match between the data type for the key field corresponding to the frame-to-be-replaced and a data type for the frame-to-be-inserted.

8. The method of claim 7 wherein the frame-to-be-replaced and the frame-to-be-inserted comprise picture element frames.

9. The method of claim 7 wherein the frame-to-be-replaced and the frame-to-be-inserted comprise audio element frames.

10. The method of claim 7 wherein the frame-to-be-replaced and the frame-to-be-inserted comprise ancillary data element frames.

11. The method of claim 3 wherein the frame-to-be-replaced comprises a plurality of frames-to-be-replaced in a sequence, and wherein the frame-to-be-inserted comprises a plurality of frames-to-be-inserted in a sequence, and wherein the method further comprises performing the parsing and extracting step, the compatibility determining step, the identifying step, and the writing step with respect to the sequences of the frames-to-be-replaced and the frames-to-be-inserted.

12. The method of claim 11 further comprising:
a processor reading a source track in response to user input, wherein the source track comprises a plurality of frames of essence data;
a processor identifying which of the frames of essence data in the source track are the frames-to-be-inserted in response to user input;
a processor selecting a target track in the finalized digital multimedia file in response to user input, the selected target track comprising a plurality of frames of essence data; and
a processor identifying which of the frames of essence data in the selected target track are the frames-to-be-replaced in response to user input.

13. The method of claim 3 wherein the building step comprises a processor (1) determining a plurality of byte offsets for each of a plurality of the frames in the finalized digital multimedia file, and (2) populating the data structure with the determine byte offsets to identify where the frames corresponding to the byte offsets are located.

14. The method of claim 3 further comprising:
in response to a determination that the frame-to-be-inserted is not compatible with the frame-to-be-replaced, perform a transformation on the frame-to-be-inserted to modify a format for the new frame to render it compatible with the frame-to-be-replaced for inclusion in the finalized digital multimedia file.

15. The method of claim 3 wherein the finalized digital multimedia file comprises a Media Exchange Format (MXF) file, an Apple Quicktime format (MOV) file, or an Audio Video Interleave (AVI) format file.

16. The method of claim 2 wherein the finalized digital multimedia file retains its internal structure after the directly editing step.

17. The method of claim 1 wherein the data structure indexes the frames of the finalized digital multimedia file based on the byte offsets for the frames within the finalized digital multimedia file.

18. The method of claim 1 wherein the frame-to-be-replaced and the frame-to-be-inserted comprise further comprise audio frames, and wherein the compatibility determining step comprises further checking for compatibility with respect to sample rate, bit rate, and bit depth as between the audio frame-to-be-replaced and the audio frame-to-be-inserted.

19. An apparatus comprising:
a memory configured to store a target finalized digital multimedia file, the target finalized digital multimedia file comprising a media track, the media track comprising (1) a plurality of frames of essence data and (2) metadata about the frames, wherein the metadata and the frames are interleaved within the target finalized digital multimedia file; and
a processor for cooperation with the memory, the processor configured to (1) perform a read of the target finalized digital multimedia file from the memory, (2) in response to the read, determine a location in the target finalized digital multimedia file corresponding to an old frame, (3) determine whether a new frame is compatible with the old frame based on a plurality of compatibility requirements, wherein the compatibility requirements include (i) a requirement for a data format match between the old frame and the new frame and (ii) a requirement for a data size match between the old frame and the new frame, and (4) in response to a determination that the new frame is compatible with the old frame, perform an insert edit directly on the target finalized digital multimedia file via a write of the new frame over the old frame at the determined location in the target finalized digital multimedia file to create an edited finalized digital multimedia file without altering the metadata of the target finalized digital multimedia file such that the edited finalized digital multimedia file comprises the same metadata as the target finalized digital multimedia file to thereby obviate a requirement to re-export the edited finalized digital multimedia file;
wherein the old frame and the new frame comprise video frames, and wherein the data format compatibility requirement includes compatibility with respect to resolution, pixel format, and bit depth as between the old frame and the new frame.

20. The apparatus of claim 19 wherein the processor is further configured to:
analyze the new frame to determine metadata about the new frame;
analyze the read target finalized digital multimedia file to determine metadata about the target finalized digital multimedia file;
perform the compatibility determination based on the determined metadata about the new frame and the determined metadata about the target finalized digital multimedia file;
build a data structure in response to the read of the target finalized digital multimedia file, wherein the data structure identifies where a plurality of the frames are located within the target finalized digital multimedia file; and
as part of the insert edit operation, (1) seek in the target finalized digital multimedia file to the determined location based on the data structure, and (2) write the compatible new frame into the target finalized digital multimedia file over the old frame at the determined location to create the edited finalized digital multimedia file.

21. The apparatus of claim 20 wherein the target finalized digital multimedia file is embodied as a sequence of bytes, the byte sequence comprising a plurality of essence containers in which the essence data is located, each of a plurality of the essence containers comprising a sequence of content packages, each of a plurality of the content packages comprising a plurality of content package elements for a plurality of data types, the data types comprising a picture element type, an audio element type, and an ancillary data element type;
wherein each of a plurality of the content package elements comprises a (1) a key field that comprises data indicative of the data type for that content package element, (2) a length field that comprises data indicative of a length for a frame within that content package element, and (3) the frame for that content package element, wherein the metadata about the target finalized digital multimedia file comprises the key fields and the length fields for the content package elements;
wherein the processor is further configured to read the length fields of the content package elements to support the data structure build operation; and
wherein the processor, as part of a determination that the target finalized digital multimedia file is compatible with the new frame, is further configured to require a data type match between the data type for the key field corresponding to the old frame and a data type for the new frame.

22. The apparatus of claim 20 wherein the processor is further configured to:
in response to a determination that the new frame is not compatible with the target finalized digital multimedia file, perform a transformation on the new frame to modify a format for the new frame to render it compatible with the target finalized digital multimedia file.

23. The apparatus of claim 20 wherein the data structure indexes the frames of the target finalized digital multimedia file based on the byte offsets for the frames within the finalized digital multimedia file.

24. The apparatus of claim 23 wherein the data structure also identifies a data size for each of the frames in the target finalized digital multimedia file.

25. The apparatus of claim 23 wherein the processor is further configured to permit, via the data structure, performance of the insert edit operation on any of the frames in the target finalized digital multimedia file.

26. The apparatus of claim 19 wherein the target finalized digital multimedia file comprises a plurality of the media tracks;
wherein the old frame comprises a plurality of old frames;
wherein the new frame comprises a plurality of new frames as a sequence of new frames;
wherein the processor is further configured to:
read a source track in response to user input, wherein the source track comprises a plurality of frames of essence data;
identify which of the frames of essence data in the source track are the sequence of new frames in response to user input;
select a media track in the finalized digital multimedia file in response to user input, the selected media track comprising a plurality of frames of essence data;

identify which of the frames of essence data in the selected media track are the old frames in response to user input; and perform the compatibility determination and the insert edit with respect to the identified sequence of new frames such that the edited finalized digital multimedia file replaces the identified old frames with the new frames while retaining the same metadata as the target finalized digital multimedia file to thereby obviate a requirement to re-export the edited finalized digital multimedia file.

27. The apparatus of claim 19 wherein the edited finalized digital multimedia file retains a positioning, layout, and ordering of frames and metadata therewithin that are unchanged relative to the finalized digital multimedia file immediately prior to the insert edit.

28. The apparatus of claim 19 wherein the old frame and the new frame further comprise audio frames, and wherein the data format compatibility requirement further includes compatibility with respect to sample rate, bit rate, and bit depth as between the old audio frame and the new audio frame.

29. A computer program product comprising:
a plurality of processor-executable instructions resident on a non-transitory computer-readable medium, the instructions configured, upon execution by a processor, to cause the processor to:
read of a target finalized digital multimedia file from a memory, the target finalized digital multimedia file comprising a media track, the media track comprising (1) a plurality of frames of essence data and (2) metadata about the frames, wherein the metadata and the frames are interleaved within the target finalized digital multimedia file;
in response to the read, (1) build a frames index that identifies byte offsets for the frames in the target finalized digital multimedia file, and (2) determine a location in the target finalized digital multimedia file corresponding to an old frame based on the byte offsets in the frames index;
determine whether a new frame is compatible with the old frame based on a plurality of compatibility requirements, wherein the compatibility requirements include (i) a requirement for a data format match between the old frame and the new frame and (ii) a requirement for a data size match between the old frame and the new frame; and
in response to a determination that the new frame is compatible with the old frame, perform an insert edit directly on the target finalized digital multimedia file via a write of a new frame over the old frame at the determined location in the target finalized digital multimedia file to create an edited finalized digital multimedia file without altering the metadata of the target finalized digital multimedia file such that the edited finalized digital multimedia file comprises the same metadata as the target finalized digital multimedia file to thereby obviate a requirement to re-export the edited finalized digital multimedia file; and
wherein the old frame and the new frame comprise video frames, and wherein the data format compatibility requirement includes compatibility with respect to resolution, pixel format, and bit depth as between the old frame and the new frame.

30. The computer program product of claim 29 wherein the instructions are further configured, upon execution by a processor, to cause the processor to:
permit, via the frames index, performance of the insert edit on any of the frames in the target finalized digital multimedia file.

31. The computer program product of claim 29 wherein the frames index also identifies a data size for each of the frames in the target finalized digital multimedia file.

32. The computer program product of claim 29 wherein the old frame and the new frame further comprise audio frames, and wherein the data format compatibility requirement further includes compatibility with respect to sample rate, bit rate, and bit depth as between the old audio frame and the new audio frame.

33. A method for editing a finalized digital multimedia file, wherein the finalized digital multimedia file comprises a plurality of frames that serve as media content for the finalized digital multimedia file, the method comprising:
a processor parsing and extracting metadata about a frame-to-be-replaced in the finalized digital multimedia file and a frame-to-be-inserted into the finalized digital multimedia file;
a processor determining whether the frame-to-be-replaced and the frame-to-be-inserted are compatible with respect to data size and data format based on the parsed and extracted metadata;
a processor building a data structure that identifies where the frames in the finalized digital multimedia file are located within the finalized digital multimedia file; and
in response to a determination that the frame-to-be-replaced and the frame-to-be-inserted are compatible, a processor (1) identifying a location in the finalized digital multimedia file for the frame-to-be-replaced based on the data structure, and (2) directly editing the finalized digital multimedia file by writing over the frame-to-be-replaced with the frame-to-be-inserted at the identified location; and
wherein the frame-to-be-replaced and the frame-to-be-inserted comprise audio frames, and wherein the compatibility determining step comprises checking for compatibility with respect to sample rate, bit rate, and bit depth as between the frame-to-be-replaced and the frame-to-be-inserted.

34. An apparatus comprising:
a memory configured to store a target finalized digital multimedia file, the target finalized digital multimedia file comprising a media track, the media track comprising (1) a plurality of frames of essence data and (2) metadata about the frames, wherein the metadata and the frames are interleaved within the target finalized digital multimedia file; and
a processor for cooperation with the memory, the processor configured to (1) perform a read of the target finalized digital multimedia file from the memory, (2) in response to the read, determine a location in the target finalized digital multimedia file corresponding to an old frame, (3) determine whether a new frame is compatible with the old frame based on a plurality of compatibility requirements, wherein the compatibility requirements include (i) a requirement for a data format match between the old frame and the new frame and (ii) a requirement for a data size match between the old frame and the new frame, and (4) in response to a determination that the new frame is compatible with the old frame, perform an insert edit directly on the target finalized digital multimedia file via a write of the new frame over the old frame at the determined location in the target finalized digital multimedia file to create an edited finalized digital multimedia file without altering the metadata of the target finalized digital multimedia file such that the edited finalized digital multimedia file comprises the same metadata as the target finalized digital multimedia file to thereby obviate a requirement to re-export the edited finalized digital multimedia file;

wherein the old frame and the new frame comprise audio frames, and wherein the data format compatibility requirement includes compatibility with respect to sample rate, bit rate, and bit depth as between the old frame and the new frame.

35. A computer program product comprising:

a plurality of processor-executable instructions resident on a non-transitory computer-readable medium, the instructions configured, upon execution by a processor, to cause the processor to:

read of a target finalized digital multimedia file from a memory, the target finalized digital multimedia file comprising a media track, the media track comprising (1) a plurality of frames of essence data and (2) metadata about the frames, wherein the metadata and the frames are interleaved within the target finalized digital multimedia file;

in response to the read, (1) build a frames index that identifies byte offsets for the frames in the target finalized digital multimedia file, and (2) determine a location in the target finalized digital multimedia file corresponding to an old frame based on the byte offsets in the frames index;

determine whether a new frame is compatible with the old frame based on a plurality of compatibility requirements, wherein the compatibility requirements include (i) a requirement for a data format match between the old frame and the new frame and (ii) a requirement for a data size match between the old frame and the new frame; and in response to a determination that the new frame is compatible with the old frame, perform an insert edit directly on the target finalized digital multimedia file via a write of a new frame over the old frame at the determined location in the target finalized digital multimedia file to create an edited finalized digital multimedia file without altering the metadata of the target finalized digital multimedia file such that the edited finalized digital multimedia file comprises the same metadata as the target finalized digital multimedia file to thereby obviate a requirement to re-export the edited finalized digital multimedia file; and wherein the old frame and the new frame comprise audio frames, and wherein the data format compatibility requirement includes compatibility with respect to sample rate, bit rate, and bit depth as between the old frame and the new frame.

* * * * *